(12) United States Patent
Salutari

(10) Patent No.: US 11,698,255 B2
(45) Date of Patent: *Jul. 11, 2023

(54) GYROSCOPE, SUPPORT DEVICE, ANTI-ROLL STABILIZER, VESSEL, USE OF A GYROSCOPE, AND METHOD OF SERVICING OR MAINTAINING A GYROSCOPE

(71) Applicant: Smartgyro S.R.L., La Spezia (IT)

(72) Inventor: Paolo Salutari, La Spezia (IT)

(73) Assignee: Smartgyro S.R.L., La Spezia (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,297

(22) Filed: Jul. 19, 2022

(65) Prior Publication Data
US 2022/0349711 A1    Nov. 3, 2022

Related U.S. Application Data

(63) Continuation of application No. 17/250,078, filed as application No. PCT/EP2019/063375 on May 23, 2019, now Pat. No. 11,428,530.

(30) Foreign Application Priority Data
May 24, 2018   (IT) ......................... 102018000005683

(51) Int. Cl.
*G01C 19/16* (2006.01)
*B63B 39/04* (2006.01)

(52) U.S. Cl.
CPC .............. *G01C 19/16* (2013.01); *B63B 39/04* (2013.01)

(58) Field of Classification Search
CPC ................................ G01C 19/16; B63B 39/04
See application file for complete search history.

(56) References Cited

U.S. PATENT DOCUMENTS

| 769,493 A | 9/1904 | Schilick |
| 1,332,205 A * | 3/1920 | Dieter ................... G01C 19/16 384/609 |

(Continued)

FOREIGN PATENT DOCUMENTS

| FR | 1557766 | 12/1967 |
| FR | 1561865 | 2/1969 |
| WO | WO 1999/013553 | 3/1999 |

OTHER PUBLICATIONS

XTL_Marine_2019_Smartgyro_yacht_stabilizer XTL Marine LLC (2019) Smartgyro yacht stabilizer maker signs deal with XTL Marine, 6 pages; Available Web Site http://www.xtlmarine.ae/press-release/smart-gyro-2/; Last update: Jan. 9, 2020; Accessed on: Jan. 17, 2019.

*Primary Examiner* — Jake Cook
(74) *Attorney, Agent, or Firm* — Adsero IP

(57) ABSTRACT

Method of servicing or maintaining a gyroscope of an anti-roll stabilizer onboard of a seacraft. The method comprising a step of providing a seacraft provided with an anti-roll stabilizer. The stabilizer comprises a gyroscope comprising a container housing a rotor including a flywheel and a flywheel shaft that is rotatably mounted within said container by means of two support devices placed inside said container and arranged to support a respective end of said flywheel shaft so as to allow the relative rotation of said shaft with respect to said container. The container comprises a base portion mounted on a suspension held by a frame of the anti-roll stabilizer so as to be able to oscillate around a first axis transverse with respect to a rotation axis of the flywheel shaft. The container further comprises two end portions removably connected to said base portion. The method further comprising the steps of: removing one of the end portions from the base portion onboard of the seacraft; placing back said removed end portion and reconnecting (Continued)

said end portion with the base portion onboard of the seacraft; and pumping out air of the interior of the container of the gyroscope onboard of the seacraft after the container of the gyroscope has been reassembled.

19 Claims, 15 Drawing Sheets

(56) References Cited

U.S. PATENT DOCUMENTS

| | | |
|---|---|---|
| 1,590,778 A | 6/1926 | Schein |
| 1,655,800 A | 1/1928 | Schein |
| 2,104,226 A | 1/1938 | Gonzales |
| 4,242,917 A | 1/1981 | Bennett |
| 11,428,530 B2 | 8/2022 | Salutari |
| 2007/0157749 A1 | 7/2007 | Adams |
| 2013/0199314 A1 | 8/2013 | Habibvand |
| 2018/0051988 A1 | 2/2018 | Miocevich |
| 2021/0231437 A1 | 7/2021 | Salutari |

\* cited by examiner

GYROSCOPE, SUPPORT DEVICE, ANTI-ROLL STABILIZER, VESSEL, USE OF A GYROSCOPE, AND METHOD OF SERVICING OR MAINTAINING A GYROSCOPE

RELATED APPLICATIONS

This application is a continuation of U.S. application Ser. No. 17/250,078 filed on Nov. 10, 2020, entitled "Gyroscope, Support Device, Anti-Roll Stabilizer, Vessel, Use of a Gyroscope, and Method of Servicing or Maintaining a Gyroscope", which is a 35 U.S.C. § 371 national phase application of PCT/EP2019/063375 (WO 2019/224322), filed on May 23, 2019, entitled "Gyroscope, Support Device, Anti-Roll Stabilizer, Vessel, Use of a Gyroscope, and Method of Servicing or Maintaining a Gyroscope", and which application claims the benefit Italian Application No. 102018000005683, filed May 24, 2018, all of which are incorporated herein by reference in their entirety.

The present disclosure relates to an anti-roll stabilizer.

Anti-roll stabilizers are devices used for reducing the rolling of seacraft.

Different types of anti-roll stabilizers are known.

For example, hydraulic fin stabilizers are known. Such anti-roll stabilizers may comprise one or more fins outwardly extending from a hull of a vessel beneath the waterline of the seacraft. Although fin stabilizers may help to counteract rolling of a vessel, a disadvantage may lie in that such stabilizers have little effect when a seacraft is at low speed or at anchor.

Gyro anti-roll stabilizers form an alternative type of stabilizer that can work relatively well for seacraft, such as yachts, at low speeds or at anchor.

Gyro anti-roll stabilizers exploit the physical principle of the gyroscope, whereby a rotating mass offers a greater opposition to an external force which attempts to divert the trajectory thereof.

The gyroscope of an anti-roll stabilizer comprises a flywheel mounted on a shaft, actuated by an electric motor, in which it is supported by rolling bearings (usually ball bearings). The flywheel of such gyroscope may rotate at a relatively high rotational speed, for instance, in particular when used in yachts, at a rotational speed of for instance about 5.500 or about 7.500 rpm.

Extremely briefly, the gyroscope being able to oscillate, with respect to two axes, it creates an action of contrast to the oscillations whereto the seacraft is subjected and, in particular, to rolling.

Anti-roll stabilizers are devices installed inside the hulls of seacraft, near the keel.

The bearings that support the shaft of the flywheel are subject to strong wear in that they have to withstand very high radial thrusts and consequently have to be replaced frequently.

Currently the replacement of the ball bearings of the gyroscopes of anti-roll stabilizers requires the removal of the gyroscope of the seacraft.

Removal of the gyroscope from the seacraft is a relatively long, complex and costly operation which has to be performed in a shipyard.

An object of the present disclosure is enabling to provide an alternative anti-roll stabilizer for a seacraft, preferably a stabilizer counteracting at least one disadvantage of a known anti-roll stabilizer.

In particular, it is an object of the inventor to propose a gyroscope, for an anti-roll stabilizer for seacraft, able to overcome, at least in part, a problem of the prior art.

More particularly, an object of the inventor is that of proposing a gyroscope, for an anti-roll stabilizer for seacraft, which allows the rolling bearings to be replaced more easily, faster and/or more economically.

Even more particularly, an object of the inventor is that of proposing a gyroscope, for an anti-roll stabilizer for seacraft, which is made in such a way as to allow the operation of replacement of the rolling bearings to be carried out without the need to remove the gyroscope from the seacraft.

Yet another object of the inventor is that of proposing an economical solution for making a gyroscope, for an anti-roll stabilizer for seacraft.

Thereto, the present disclosure provides for a gyroscope for an anti-roll stabilizer for seacraft, comprising: a container, apt to be mounted on a suspension so as to be able to oscillate around a first axis; a flywheel, placed inside said container, having a shaft apt to rotate around a second axis, transverse with respect to said first axis, said shaft of said flywheel having a first end and a second end; a first support device, placed inside said container, apt to support said first end of said shaft so as to allow the relative rotation of said shaft with respect to said container; a second support device, placed inside said container, apt to support said second end of said shaft so as to allow the relative rotation of said shaft with respect to said container; an electric motor, placed inside said container, arranged for rotating said shaft of said flywheel, wherein said container comprises a base portion apt to be mounted on the suspension, a first end portion, for instance formed as an upper portion or so-called top end portion, which is connected removably to said base portion, and a second end portion, for instance formed as a lower portion or so-called bottom end portion, which is connected removably to said base portion; wherein said first support device comprises a first element connected removably to said first end of said shaft and a second element, coaxial to said first element, which is connected removably to said container, said first element being able to rotate with respect to said second element, said first and second elements of said first support device being connected one to the other by means of at least one rolling bearing, said at least one rolling bearing preferably being formed as at least one ball bearing; and wherein said second support device comprises a first element connected removably to said second end of said shaft and a second element, coaxial to said first element, which is connected removably to said container, said first element being able to rotate with respect to said second element, said first and second elements of said second support device being connected one to the other by means of at least one rolling bearing, said at least one rolling bearing preferably being formed as at least one ball bearing.

By making the first end portion and the second end portion of the container removably connected to the base portion of the container, the container can be opened at least partly, for instance in order to service the gyroscope. This may for example facilitate onboard maintainability, for instance as it may facilitate that a support device, which forms a so-called bearing assembly that comprises at least one, and preferably at least two bearings that are located next to each other in the axial direction of the shaft, can be replaced onboard, without the need of integrally removing the entire container of the gyroscope from the seacraft.

The gyroscope of the present disclosure may thus be considered as having a modular container, which in particular can be assembled such as to form an airtight container, for instance integrally replacing a worn support device, which for example may comprise multiple rolling bearings and/or a cooling channel or other cooling arrangement.

Advantageously, the gyroscope can be arranged such that the first and second support devices are each removably connected to the base portion. In particular, the first support device may be removably connected to an upper part of the base portion and the second support device may be removably connected to a lower part of the base portion.

In embodiments, the first end portion of the container can have a height of at least ¼, at least ⅓, of the total height of the container, and/or the lower portion of the container can have a height of at least ¼, and preferably at least ⅓, of the total height of the container. As a result, relatively much of the container can be temporarily removed from the base portion, for instance in order to service the gyroscope.

For instance in order to facilitate removing the first end portion and/or the second end portion of the container, in particular on board of a vessel, especially while the base portion of the gyroscope is kept being suspended in a frame within the vessel, the first end portion and/or the second end portion may be build up from multiple parts, such as for instance two or three parts each. Such parts, which for instance may be formed as segments of a substantially spherical shaped housing, may for instance be substantially formed as annular elements or as substantially cap-shaped covers.

Additionally or alternatively, such parts may be made of aluminium or aluminium alloy, in particular such as to allow that they can have a relatively low mass as a result of which they may be handled relatively easily. For example, each part, e.g. annular element or cover, may for instance have mass of at most 75 kg, preferably at most 60 kg, more preferably at most 50 kg or even less, in particular such that each can be handled, e.g. removed from the gyroscope and/or placed back, without the need of a hoist or the like, and for instance by three, two or even just one person.

Additionally or alternatively, the electric motor and/or each of the support devices can have a mass of at most 75 kg, preferably at most 60 kg, more preferably at most 50 kg or even less, in particular such that each can be handled, e.g. removed from the gyroscope, placed back and/or replaced, without the need of a hoist or the like, and for instance by three, two or even just one person. For example, the electric motor may have a mass of about 15 kg to 30 kg, such as about 20 kg. Additionally or alternatively, the first support device and/or the second support device may each have a mass of about 30 kg to 60 kg, such as about 45 kg.

Advantageously, when seen in axial direction of the shaft of the flywheel, the electric motor and the second support device can each be located at opposite sides of the first support device. In other words, when seen in axial direction of the shaft of the flywheel, the first support device can be substantially located between the flywheel and the electric motor. The electric motor may thus be located at a proximal end of the shaft. This may enable that the motor may be removed and/or replaced without removing any one of the two support devices. Additionally or alternatively, it may counteract the risk that cables, such as power cables, may unintentionally touch moving parts, such as the flywheel.

In preferred embodiments, the electric motor can have a motor shaft which is apt to transmit a torque to the first end of the shaft, and in particular it may extend substantially in line and coaxially with the shaft of the flywheel.

By providing a pump, in particular a so-called vacuum pump, onboard of the seacraft, preferably as a part of an anti-roll stabilizer of which the gyroscope forms a part, it can be facilitated that, after closing the container of the gyroscope, air can be pumped out of the interior of the container of the gyroscope onboard of the seacraft. As a result, a relatively low air pressure can be reinstated within said container onboard of a vessel, thus without the need of visiting a shipyard or the like. As a result of such low air pressure, which preferably may form a partial vacuum and/or may in particular be at most 0.5 bar, more in particular 0.3 bar, such as for instance about 0.2 bar or about 0.1 bar, a spinning flywheel may be rotated at a relatively high rotational speed by a relatively low power electrical motor, as there may be relatively little air resistance or drag. Since a relatively high rotational speed may facilitate that a relatively large gyroscopic torque can be produced, roll movement of the seacraft may be compensated relatively well at a relatively low power consumption. In embodiments, the reduced air pressure may be at most 0.1 bar, in particular at most 0.05 bar, which may be at most about 50 torr, more in particular at most 0.03 bar.

In embodiments, the container of the gyroscope can be provided with an air outlet, in particular an air outlet pipe, more in particular a flexible air outlet pipe, tube or hose, for at least partly vacuuming, preferably substantially vacuuming, the interior of the container. It will be appreciated that the air outlet may be provided with a valve, for instance a one-way valve, to counteract that air may flow back into the container. Alternatively or additionally, a valve may be provided on the container itself, and/or on or at the pump. However, it will be appreciated that the gyroscope, in particular its container, for instance its valve, and/or another part of an anti-roll stabilizer provided with said gyroscope, such as the pump of such stabilizer, may be arranged to let air flow back into the container to increase the air pressure in the container in order to facilitate removing one or more parts of the container, for instance in order to replace a respective support device. This may for instance be done by disconnecting a flexible air outlet tube or line that connected the container with the pump. In embodiments, the anti-roll stabilizer can be provided with an air pressure sensor or so-called vacuum sensor to sense whether the air pressure within the container is low enough and/or within a desired range. For example, such air pressure sensor may be provided in the gyroscope, in particular within its container, but may alternatively be located elsewhere, for instance in or at the pump and/or in the air outlet pipe, tube, hose or line. It will be appreciated that the anti-roll stabilizer comprising the gyroscope can be arranged to control the pump based on such sensed data.

Advantageous, parts of the container, or so-called gyroscope housing, that are removably connected to each other can be joined by means of seals, for instance formed as gaskets. It has been found that such seals may be relatively effective and/or reliable when they are formed at least as double seals, for instance formed by two interspaced gaskets or seals.

In advantageous embodiments, the first element of a respective support device, which first element is connected removably to a respective end of the flywheel shaft, may have a height, measured along the axial direction, which preferably can be larger than the inner diameter of said first element. Preferably, said height may be at least 1.5 times said diameter. This may facilitate that that one support device may, once the other support device has been removed during servicing of the gyroscope, hold an end of the shaft of the flywheel in such a manner that it substantially can be counteracted that the shaft can tilt. The gyroscope can thus be arranged, at least in embodiments, such that, during servicing or repairing the gyroscope, a single support device may hold the flywheel shaft, in particular in substantially upright position, more in particular in a manner in which the weight of the flywheel or so-called rotor may substantially rest on the support device then still present in the gyroscope, yet more in particular the load of said rotor or flywheel may then be supported by the respective first element of said support device, which first element may be formed as an inner element or inner part of said support device or so-called bearing assembly.

The present disclosure also relates to a support device, in particular a support device for a gyroscope of an embodiment of the present disclosure.

The present disclosure also relates to an anti-roll stabilizer, which may comprise a gyroscope having one or more features of one or more of the embodiments of such gyroscope disclosed herein.

The present disclosure also relates to a vessel, such as a yacht, or other seacraft, provided with a gyroscope or provided with a gyro anti-roll stabilizer, and the use of such a vessel, such a gyroscope and/or such a stabilizer.

Furthermore, the disclosure relates to a method of servicing a gyroscope or an anti-roll stabilizer.

Further advantages can be achieved by means of the additional features of the dependent claims.

Advantageous embodiments according to the disclosure are described in the description of the figures, in the clauses and in the appended claims.

Two possible embodiments of a gyroscope for an anti-roll stabilizer for seacraft are described here below with reference to the accompanying drawings, in which.

Figure 1:
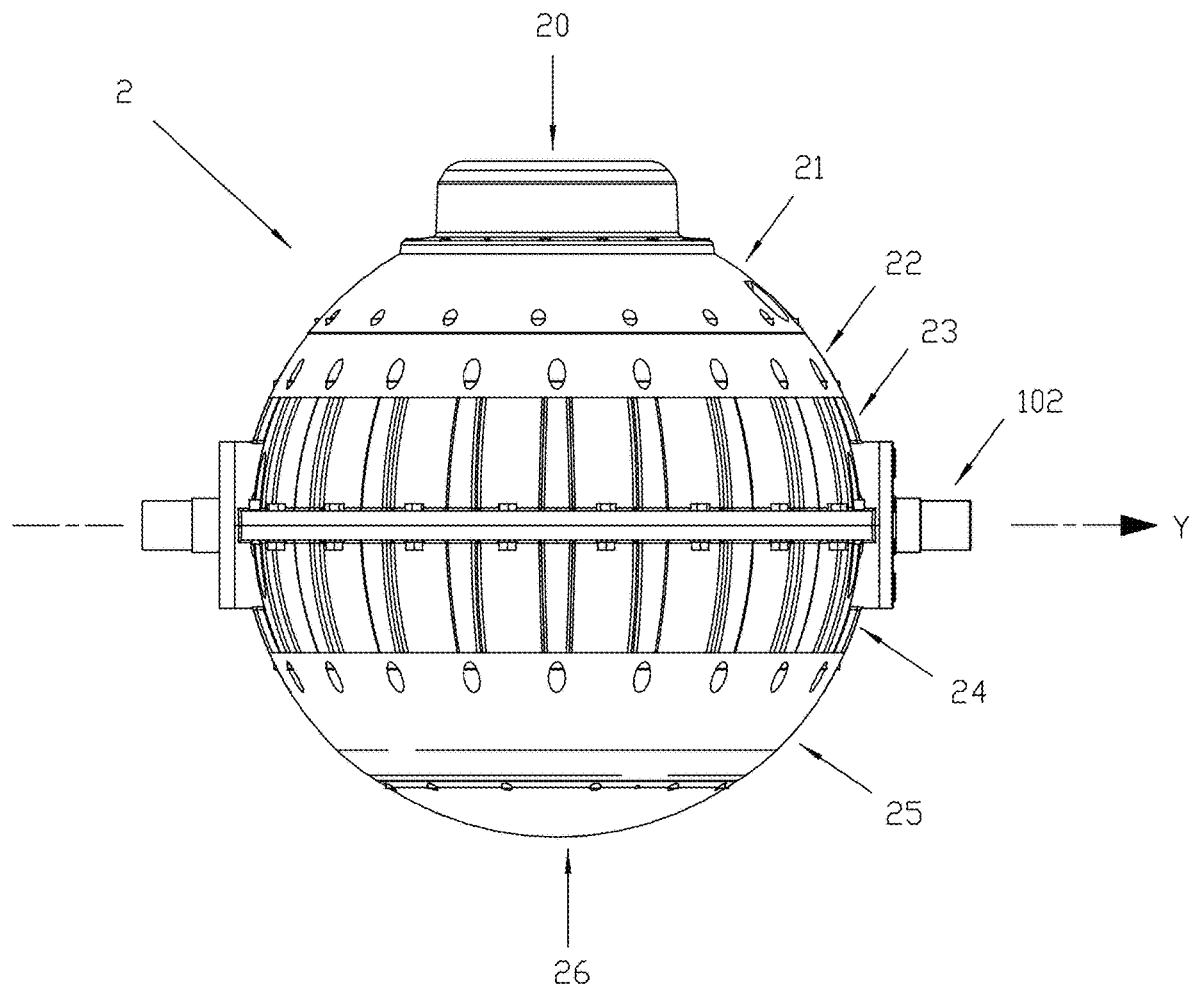
FIG. 1 is a front view of a first embodiment of a gyroscope of an anti-roll stabilizer, with a rotor enclosed in a container.
Figure 2:
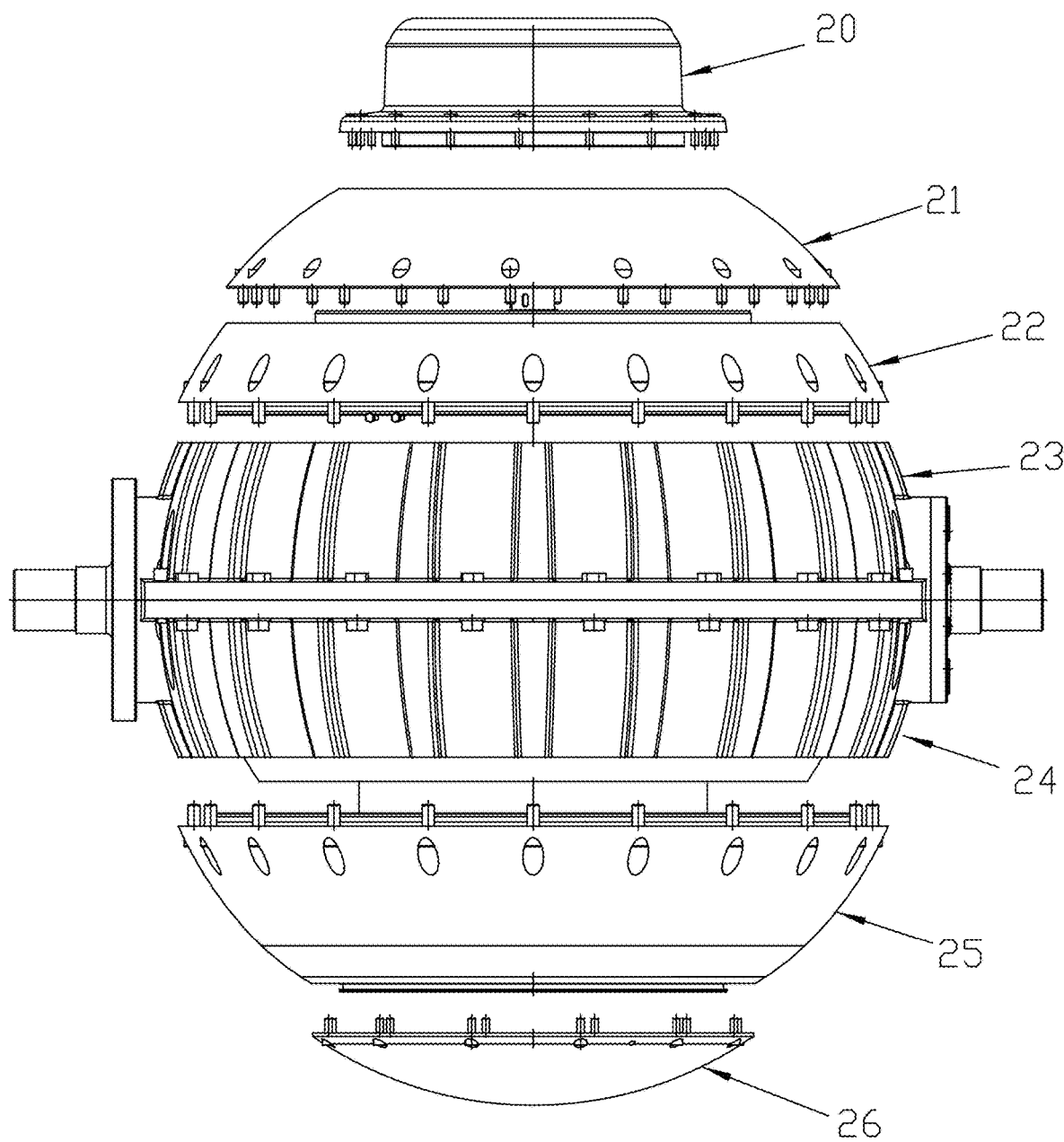
FIG. 2 is a view, partially blown up, of the same gyroscope of FIG. 1.
Figure 3:
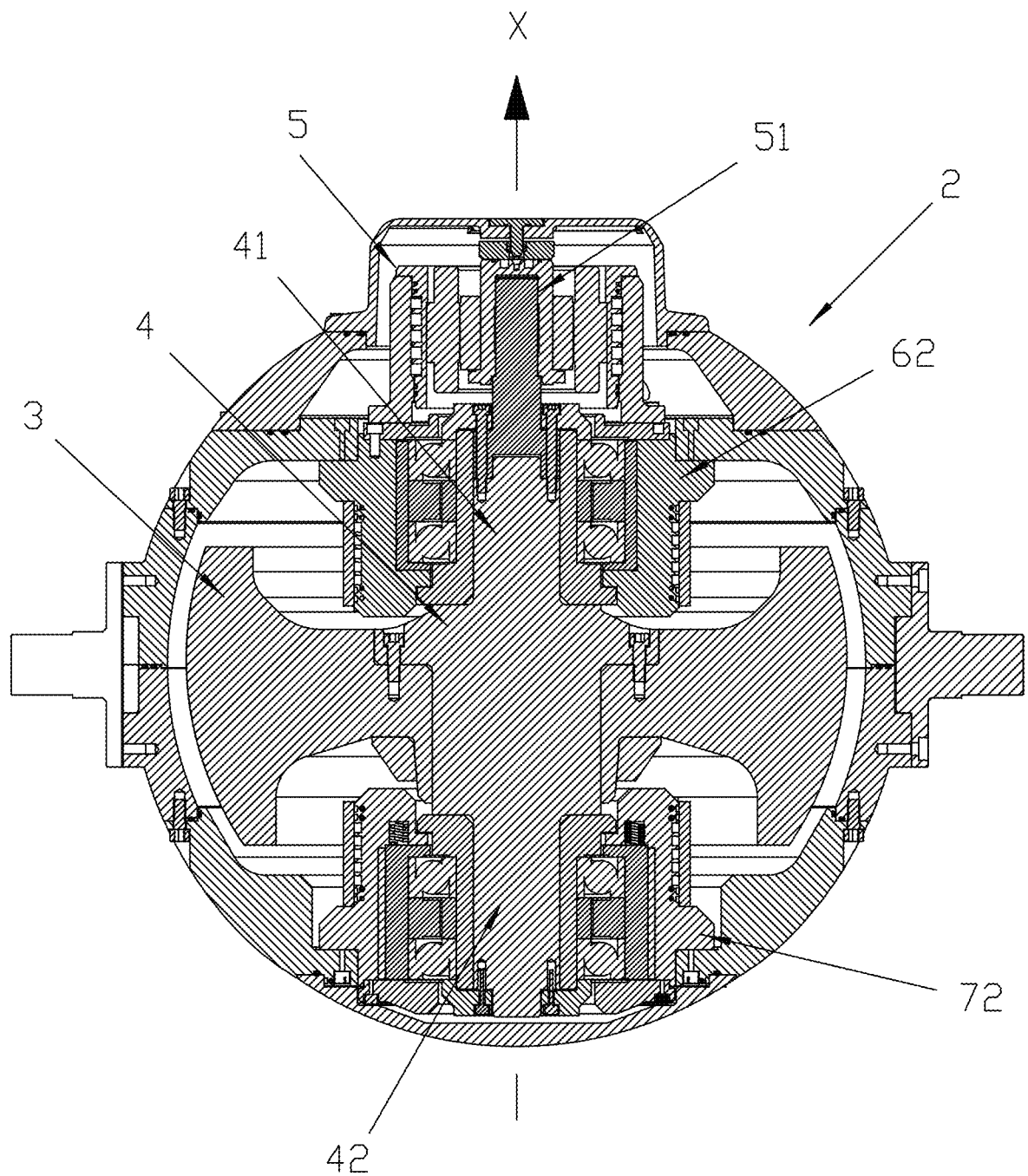
FIG. 3 is a longitudinal section view of the gyroscope of FIG. 1.

Referring to the accompanying drawings and to the numbering adopted in the drawings, number 1 denotes, as a whole, a gyroscope for an anti-roll stabilizer for seacraft.

The gyroscope 1 comprises a container 2 which is apt to be mounted on a suspension 102 so as to be able to oscillate around a first axis Y (also known as axis of precession).

In the example illustrated in FIGS. 1-13, the container 2 has a roughly spherical shape.

Inside the container 2 there is a rotor 3, 4 apt to rotate around a second axis X (also known as spin axis), transverse with respect to the first axis Y.

The rotor 3, 4 comprises a flywheel 3 and a shaft 4 coupled to the flywheel 3.

In the example illustrated in FIGS. 1-13, the shaft 4 is joined to the flywheel 3 by means of fasteners, which may be in the form of threaded couplings (in particular screws, such as for instance tap bolt, cap screws or other screws).

Although the rotor 3, 4 may comprise multiple parts 3, 4, in embodiments, the flywheel 3 and the shaft 4 may be formed integrally with each other.

It will be appreciated that the rotor 3, 4 may be considered to form the flywheel 3, in particular a flywheel including a rotor shaft 4.

The shaft 4 of the flywheel 3 has a first end 41 and a second end 42, opposite to the first end 41.

The flywheel 3 and/or the shaft 4 of the gyroscope 1 can be made in steel.

Inside the container 2 there is a first support device 6 and a second support device 7, which are apt to support respectively the first end 41 of the shaft 4 and the second end 42 of the shaft 4, so as to allow the relative rotation of the rotor 3, 4 around its rotational axis X.

The first support device 6, which is apt to support the first end 41 of the shaft 4, comprises a first element or internal element 611, connected removably at the first end 41 to the shaft 4 and a second element or external element 62, coaxial to the first element 611, which is connected removably to the container 2.

The first element 611, of the first support device 6, is able to rotate with respect to the second element 62.

The second support device 7 comprises a first element or internal element 711, connected removably to the second end 42 of the shaft 4 and a second element or external element 72, coaxial to the first element 711, which is connected removably to the container 2.

The first element 711, of the second support device 7, is able to rotate with respect to the second element 72.

There is then present an electric motor 5, placed inside the container 2, having a shaft 51 which is apt to transmit a torque to the first end 41 of the shaft 4.

For this purpose the shaft 51 of the electric motor 5 has an end joined removably to the first end 41 of the shaft 4 of the flywheel 3 (for example by means of a connector or mechanical coupling, which for instance may comprise one or multiple fasteners).

The container 2 of the gyroscope 1 comprises: a first cover 20, a first annular element 21 which is connected removably to the first cover 20, a second annular element 22 which is connected removably to the first annular element 21, a third annular element 23 which is connected removably to the second annular element 22, a fourth annular element 24 which is connected removably to the third annular element 23, a fifth annular element 25 which is connected removably to the fourth annular element 24, and a second cover 26 which is connected removably to the fifth annular element 25.

The covers 20, 26 and the annular elements 21, 22, 23, 24 and 25 are all made in metal, for example in aluminium or aluminium alloy.

In the embodiment illustrated in FIGS. 1-13, the covers 20, 26 and the annular elements 21, 22, 23, 24 and 25 of the container 2 are joined one to the other by means of seals 8 (only provided with a reference number in FIG. 14 which shows an alternative embodiment) so as to allow an airtight coupling.

In the example illustrated in FIGS. 1-13, the third and fourth annular elements 23 and 24 of the container 2 are connected one to the other by means of bolts and the suspensions 102 are joined to the third and to the fourth annular elements 23, 24 by means of screws screwed in threaded blind holes formed in the third and in the fourth annular elements 23, 24.

In the example illustrated in FIGS. 1-13, the first cover 20 is joined to the first annular element 21 by means of screws inserted in through holes made in the first cover 20 and screwed in threaded blind holes formed in the first annular element 21.

In the example illustrated in FIGS. 1-13, the first annular element 21 is joined to the second annular element 22 by means of screws inserted in through holes made in the first annular element 21 and screwed in threaded blind holes formed in the second annular element 22.

In the example illustrated in FIGS. 1-13, the second annular element 22 is joined to the third annular element 23 by means of screws inserted in through holes made in the second annular element 22 and screwed in blind holes, which are formed in the third annular element 23 and which could be threaded.

In the example illustrated in FIGS. 1-13, the fifth annular element 25 is joined to the fourth annular element 24 by means of screws inserted in through holes made in the fifth annular element 25 and screwed in threaded blind holes formed in the fourth annular element 24.

The first and the second elements 611, 62 of the first support device 6 (apt to support the first end 41 of the shaft 4) are connected one to the other by means of at least one rolling bearing 81a, 82a, such as for instance a ball bearing or a roller bearing.

In the example illustrated in FIGS. 1-13, the first and the second elements 611, 62 of the first support device 6 are connected one to the other by means of two rolling bearings 81a, 82a having internal rings made integral with the first element 611 and external rings made integral with the second element 62.

In the example illustrated in FIGS. 1-13, a first spacer 85a is provided, interposed between the internal rings of the bearings 81a, 82a and a second spacer 86a interposed between the external rings of the bearings 81a, 82a. However, it will be appreciated that in case multiple bearings 81a, 82a are used, it is not necessary to provide a spacer in between them, as two or more bearings may be stacked directly on top of each other, in particular in a manner in which the inner races of two stacked rolling bearings may be in direct contact with each other and the outer races of said two stacked bearings touch each other as well.

A form coupling is provided between the first element 611, of the first support device 6, and the first end 41 of the shaft 4.

The first element 611, of the first support device 6, is connected removably to the first end 41 of the shaft 4 while the second element 62, of the first support device 6, is connected removably to the second annular element 22 of the container 2.

The removable connection between the first element 611, of the first support device 6, and the first end 41 of the shaft 4 can be obtained, for example, by means of threaded connections (which comprise a flanged element or blocking flange 612 described in greater detail here below).

The removable connection between the second element 62, of the first support device 6, and the second annular element 22 of the container 2 can be obtained, for example, by means of threaded connections (described in greater detail here below).

In the example illustrated in FIGS. 1-13, the electric motor 5 is connected removably to the second element 62 of the first support device 6 (that is to say to the device apt to support the first end 41 of the shaft 4).

The removable connection between the electric motor 5 and the second element 62, of the first device 6, can be obtained, for example, by means of fasteners, in particular threaded connections, for example screws, such as in particular tap bolts, cap screws or other screws (described in greater detail here below).

The first and the second elements 711, 72 of the second support device 7 (to support the second end 42 of the shaft 4) are connected one to the other by means of at least one rolling bearing 81b, 82b.

In the example illustrated in FIGS. 1-13, the first and the second elements 711, 72 of the second support device 7 are connected one to the other by means of two rolling bearings 81b, 82b having internal rings, or so-called inner races, made integral with the first element 711 and external rings made integral with the second element 72.

In the example illustrated in FIGS. 1-13, a first spacer 85b is provided, interposed between the internal rings of the bearings 81b, 82b, and a second spacer 86b interposed between the external rings of the bearings 81b, 82b.

A form coupling is provided between the first element 711, of the second support device 6, and the second end 42 of the shaft 4.

The first element 711, of the second support device 7, apt to support the second end 42 of the shaft 4, is connected removably to the second end 42 of the shaft 4 and the second element 72 of the second support device 7 apt to support that said shaft 4 is connected removably to the fifth annular element 25 of the container 2.

The removable connection between the first element 711, of the second support device 7, and the second end 42 of the shaft 4 can be obtained, for example, by means of threaded connections (which comprise a flanged element or blocking flange 712 described in greater detail here below).

The removable connection between the second element 62, of the second support device 7, and the fifth annular element 25 of the container 2 can be obtained, for example, by means of threaded connections (described in greater detail here below).

The substitution of the first and of the second support device 6, 7 of the shaft 4 of the rotor 3, 4 takes place as described here below.

By disassembling the threaded connections described above and shown in the accompanying drawings it is possible to remove, in succession, the first cover 20 of the container 2, the first annular element 21 of the container 2 and the electric motor 5 (see FIGS. 3, 7, 8 and 9).

Having removed the motor 5 the threaded connections can be disassembled (described in greater detail here below) which connect the first element 611, of the first support device 6, to the first end 41 of the shaft 4 and the second element 62, of the first support device 6, to the second annular element 22 of the container 2.

In this way it is possible to withdraw the first support device 6 from the first end 41 of the shaft 4 to replace it with a spare one.

In the phase of assembly the operations described above are repeated in reverse order.

Figure 11:
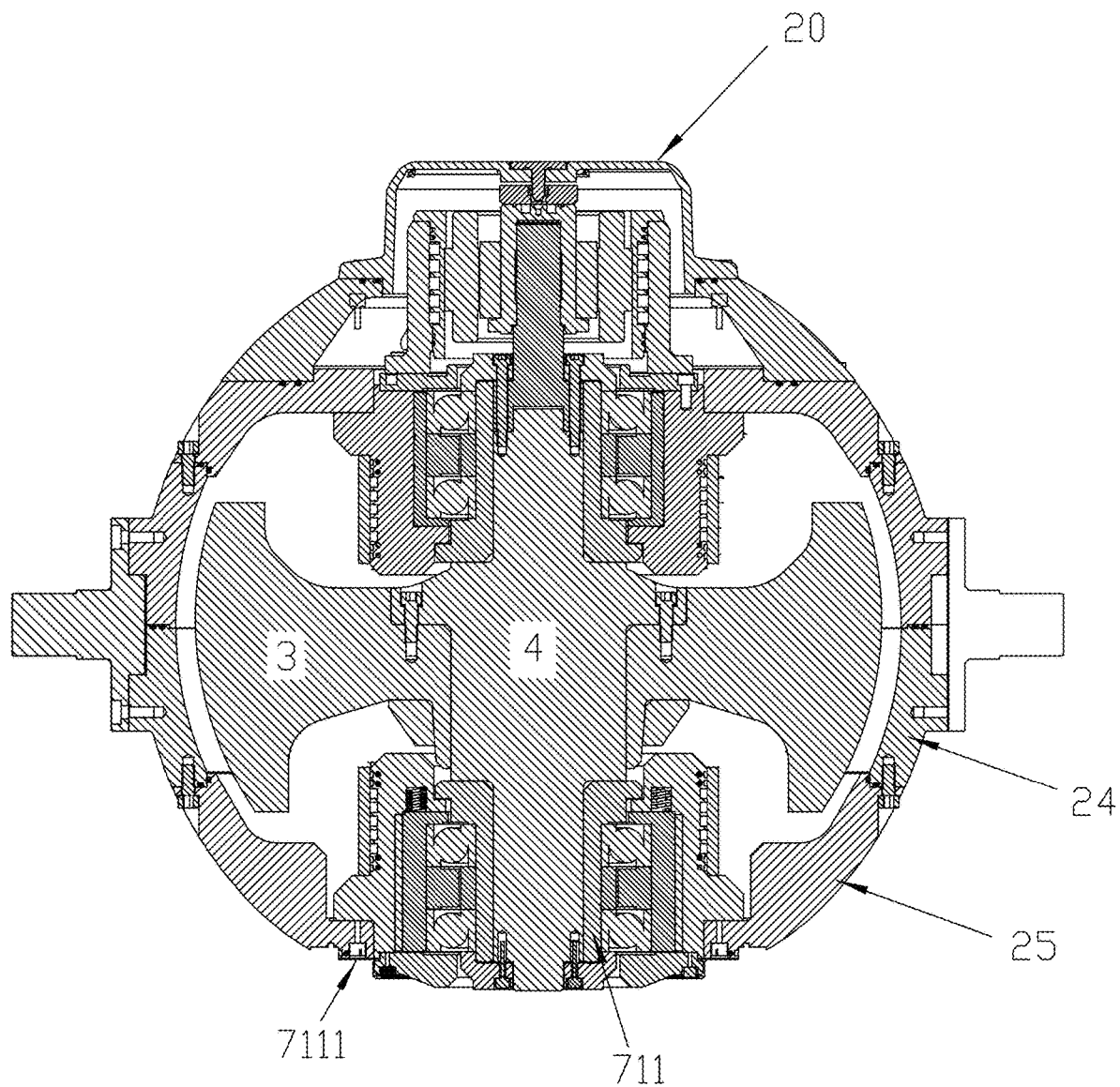
FIGS. 11, 12 and 13 are longitudinal section views of the gyroscope of FIG. 1 which show the phases of disassembly of a second part of the gyroscope.
Figure 12:
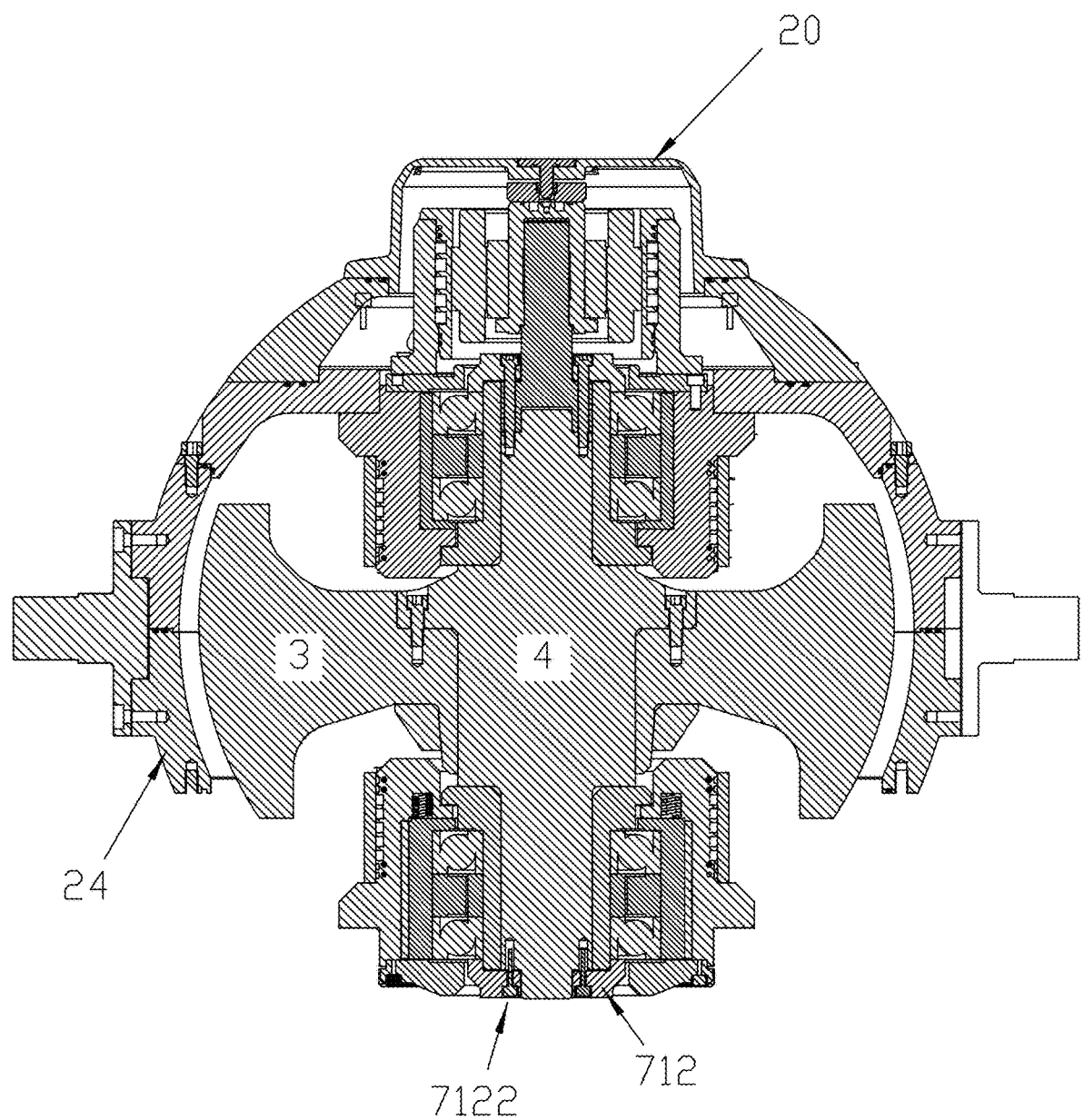
Figure 13:
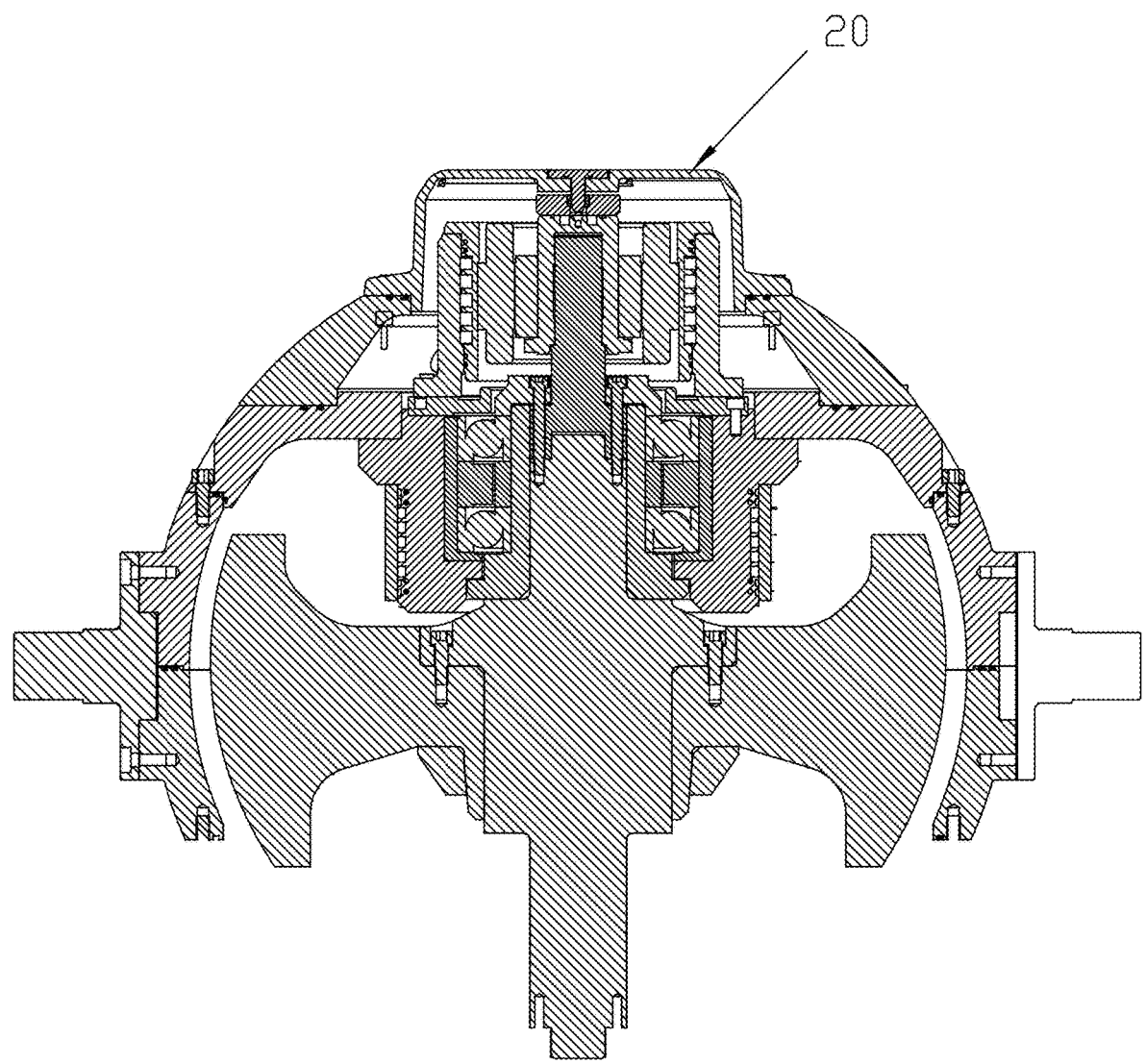

By disassembling the threaded connections it is possible to remove also the second cover 26 of the container 2 (see FIG. 11).

Having removed the second cover 26 the threaded connections can be disassembled (described in greater detail here below) which connect the first element 711, of the second support device 7, to the second end 42 of the shaft 4 and the second element 72, of the second support device 7, to the fifth annular element 25 of the container 2.

In this way it is possible to withdraw the second support device 7 to replace it with a spare one.

In the phase of assembly the operations described above are repeated in reverse order. The person skilled in the art will appreciate the fact that in case of need, for example in the case of malfunctioning of one of the support devices 6, 7 (for example in the case of wear of the rolling bearings 81a, 82a, 81b, 82b) it is possible to replace the first and/or the second support device 6, 7 of the shaft 4 of the flywheel 3 easily.

In particular the fact is underlined that it is possible to replace the two support devices 6, 7 of the shaft 4, working directly on the seacraft, without the need to bring the seacraft into the shipyard and to remove the gyroscope from the seacraft.

In the example illustrated in FIGS. 1-13, the first element 611, of the first support device 6, apt to support the first end 41 of the shaft 4, comprises a first bush 611 (for example a bush in steel), placed on the first end 41 of the shaft 4 and coupled thereto with a clearance fit, e.g. a loose fit, such as a sliding fit, such that the first support device 6 can be placed on the first shaft end 41 relatively easily and such that the first support device 6 may be removed from the first shaft end 41 relatively easily, for instance without the need of utilizing a bearing puller.

Externally the first bush 611 is coupled, with interference, with the internal rings of the two rolling bearings 81a, 82a.

The first bush 611, of the first support device 6, is shaped in such a way that the rolling bearings 81a, 82a can be threaded from only one end of the bush 611.

The first bush 611, of the first support device 6, and the first end 41 of the shaft 4 are made reciprocally integral one with the other by means of the blocking flange 612.

The blocking flange 612 is connected removably (by means of fasteners, in particular screws, more in particular tap bolts) both to the first end 41 of the shaft 4 and to the first bush 611, which is inserted on the first end 41 of the shaft 4.

For this purpose the blocking flange 612 comprises a first plurality of through holes 6121, distributed circumferentially, for the insertion of a first plurality of screws 6122 screwed in blind threaded holes made in the first end 41 of the shaft 4.

The blocking flange 612 comprises likewise a second plurality of through holes (not shown), distributed circumferentially, for the insertion of a second plurality of screws (not shown) screwed in blind threaded holes (not shown) made in the first bush 611.

The blocking flange 612 prevents the accidental exiting of the rolling bearings 81a, 82a of the first support device 6.

In the example illustrated in FIGS. 1-13, the first element 711, of the second support device 7, apt to support the second end 42 of the shaft 4, comprises a first bush 711 (for example a bush in steel), inserted on the second end 42 of the shaft 4 and coupled thereto with a clearance fit, e.g. a loose fit, such as a sliding fit, such that the second support device 7 can be placed on the second shaft end 42 relatively easily and such that the second support device 7 may be removed from the second shaft end 42 relatively easily, for instance without the need of utilizing a bearing puller.

Externally the first bush 711, of the second support device 7, is coupled, with interference, with the internal rings of the two rolling bearings 81b, 82b.

The first bush 711, of the second support device 7, is shaped in such a way that the rolling bearings 81b, 82b can be inserted from only one end of the bush 711.

The first bush 711, of the second support device 7, and the second end 42 of the shaft 4 are made reciprocally integral one with the other by means of the blocking flange 712.

The blocking flange 712 is connected removably to the second end 42 of the shaft 4 and to the first bush 711, of the second support device 7.

For this purpose the blocking flange 712 comprises a first plurality of through holes 7121, distributed circumferentially, for the insertion of a first plurality of screws 7122 screwed in blind threaded holes made in the second end 42 of the shaft 4.

The blocking flange 712 comprises likewise a second plurality of through holes (not shown), distributed circumferentially, for the insertion of a second plurality of screws (not shown) screwed in blind threaded holes (not shown) made in the first bush 711 of the second support device 7.

The blocking flange 712 is shaped in such a way as to prevent the accidental exiting of the rolling bearings 81b, 82b.

By removing the first cover 20 and, subsequently, the first annular element 21 of the container 2 it is possible to access the threaded connections (which, in the example illustrated in FIGS. 1-13, are formed by screws, such as cap screws or tap bolts or the like) which allow the electric motor 5 to be removed.

The removal of the first annular element 21 allows access to the screws which keep the second element 621, of the first support device 6, attached to the second annular element 22 of the container 2.

At this point it is possible to unscrew the screws 222 which keep joined the second annular element 22 to the third annular element 23 and remove the second annular element 22.

After having removed the motor 5 and the third annular element 23 the screws are removed which block the blocking flange 612 to the first bush 611, of the first support device 6, at the first end 41 of the shaft 4.

At this point it is possible to extract the first support device 6.

After having removed the second cover 26 of the container 2 it is possible to remove the screws 7111 which block the second element or flanged support 721 of the second support device 7 to the fifth annular element 25 of the container 2 and the screws which block the fifth annular element 25 to the fourth annular element 24.

After having removed the fifth annular element 25 the screws are removed which block the blocking flange 712 to the first bush 711, of the second support device 7, and to the second end 42 of the shaft 4.

At this point it is possible to extract the second support device 7.

In a possible embodiment the second element or external element 62, of the first support device 6 apt to support the end 41 of the shaft 4 of the rotor 3, 4 comprises a flanged support 621 (for example made in aluminium alloy).

The flanged support 621 comprises a seat 622 apt to receive the pair of rolling bearings 81a, 82a.

The flanged support 621 is joined removably to the second annular element 22 of the container 2 by means of fasteners, in particular threaded connections (such as cap screws or other screws inserted in through holes made in the second annular element 22 of the container 2 which are screwed in a series of threaded blind holes 628 made in the flanged support 621).

For this purpose the flanged support 621 comprises an external annular portion 623 in which a plurality of threaded blind holes 628, distributed circumferentially, are made.

The bush 611 and the flanged support 621 are shaped in such a way as to make a form coupling.

In the example illustrated in FIGS. 1-13, the bush 611 and the flanged support 621 have an end with two opposite shoulders 615 and 625.

In a possible embodiment the second element or external element 72, of the second support device 7 apt to support the second end 42 of the shaft 4 of the flywheel 3, comprises a flanged support 721 (for example made in aluminium alloy).

The flanged support 721 comprises a seat 722 apt to receive the pair of rolling bearings 81*b*, 82*b* and is apt to be screwed to the fifth annular element 25 of the container 2.

For this purpose the flanged support 721 comprises an external annular portion 723 in which a plurality of threaded blind holes 7221, distributed circumferentially, are made, in which screws 7111 are screwed, inserted in through holes made in the fifth annular element 25 of the container 2.

The bush 711 and the flanged support 721 are shaped in such a way as to make a form coupling.

In the example illustrated in FIGS. 1-13, the bush 711 and the flanged support 721 have an end with two opposite shoulders 715 and 725.

According to the embodiment illustrated in FIGS. 1-13, between the seat of the flanged support 621, of the first support device 6, and the external rings of the rolling bearings 81*a*, 82*a*, a lining 626 is interposed.

According to the embodiment illustrated in FIGS. 1-13, between the seat of the flanged support 721, of the second support device 7, and the external rings of the rolling bearings 81*b*, 82*b*, a lining 726 is interposed.

In accordance with the embodiment illustrated in FIGS. 1-13, in the second support device 7 a spacer 727 is likewise provided, interposed between the lining 726 and the external rings of the rolling bearings 81*b*, 82*b*.

The spacer 727 is a body substantially and/or generically tubular and is axially sliding with respect to the flanged support 721 (along the axis X).

A plurality of springs 88 is provided, for example helical springs, distributed circumferentially and developing parallel to the axis X, which press on one end of the spacer 726.

The springs 88 allow the thermal expansions, along the axis X, whereto the shaft 4 of the flywheel 3 is subjected, to be compensated.

In the example illustrated in FIGS. 1-13, the springs 88 are partially inserted in seats formed in the shoulder 725 of the flange 721.

In the example illustrated in FIGS. 1-13, the first support device 6 of the shaft 4 is provided with a screen 624 for protection of the bearings 81*a*, 82*a*. The protection screen 624 can be made integral with the flange 621 by means of removable fasteners, such as cap screws or other screws, such as tap bolts.

Similarly the second support device 7 is provided with a screen 724 for protection of the bearings 81*b*, 82*b*, which can be made integral with the flange 721 by means of fasteners, such as for instance cap screws or other screws.

In the example illustrated in FIGS. 1-13, a first liquid cooling device 91 is provided to dissipate the heat generated by the rolling bearings 81*a*, 82*a* of the first support device 6, and a second cooling device 92, to dissipate the heat generated by the rolling bearings 81*b*, 82*b* of the second support device 7.

For this purpose on the body of the flange 621 and of the flange 721 grooves are formed for the passage of the cooling liquid, covered by a cooling lining 911, 912.

The cooling liquid can be, for example, a mixture of water and glycol.

The feeding of the cooling liquid can take place, for example, by means of flexible pipes (not shown) connected to the two support devices 6 and 7 by means of unions (not shown).

In the example illustrated in FIGS. 1-13, the electric motor (5) is also cooled by means of a hydraulic circuit.

Figure 14:
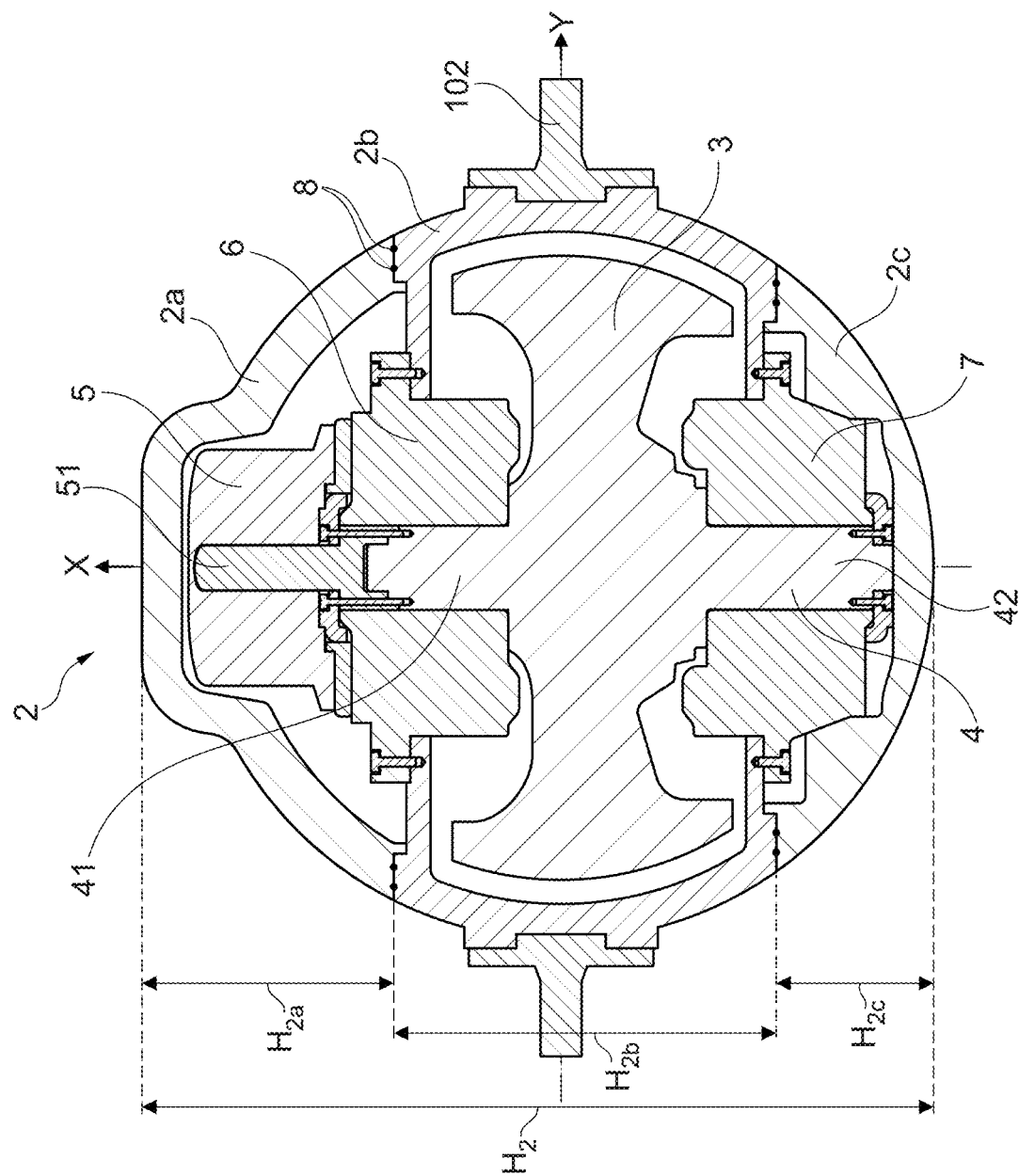
FIG. 14 shows a schematic longitudinal section view of a second embodiment of a gyroscope of an anti-roll stabilizer, with a rotor enclosed in a container.

FIG. 14 shows a schematic longitudinal section view of a second embodiment of a gyroscope 1 of an anti-roll stabilizer, with a rotor enclosed in a container 2. The gyroscope 1 may be more or less like the gyroscope of the embodiment shown in FIGS. 1-13, and comprises a container 2, apt to be mounted on a suspension 102 so as to be able to oscillate around a first axis Y. It has a rotor 3, 4 including a flywheel 3 and a flywheel shaft, which may be integrally formed, or which may be formed from two or more parts. The rotor 3, 4 is placed inside said container and is arranged to rotate around a second axis X. Thereto, the rotor is supported by two support devices 6, 7, which are formed as so-called bearing assemblies 6, 7, each of which rotatingly supporting a respective end 41, 42 of the shaft 4 of the rotor 3, 4. The flywheel 3 can be rotated by means of an electric motor 5 which preferably, such as in the here shown embodiment of FIG. 14, can be placed at a side of the respective support device 6 which side is located opposite to a side facing the other support device 7. Here, the motor 5 is located above the upper support device 6, but in alternative embodiments the motor 5 may be located below the lower support device 7.

The container 2, which preferably may be substantially made of aluminium or aluminium alloy or another relatively lightweight material, preferably a lightweight metal, comprises a base portion 2*b* apt to be mounted on the suspension 102. The container 2 also comprises a first end portion 2*a*, for instance an upper portion 2*a*, which is connected removably to said base portion 2*c*. The container 2 also comprises a second end portion 2*c*, such as a lower portion 2*c*, which is connected removably to said base portion 2*b*.

Figure 4:
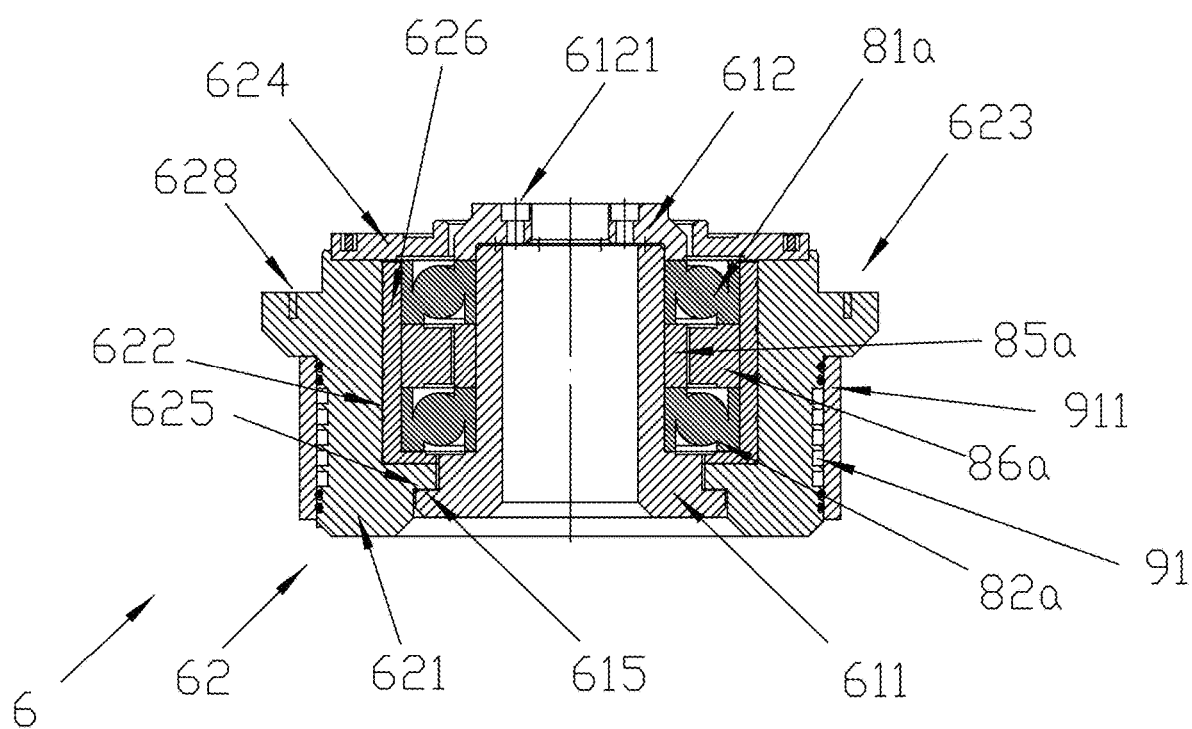
FIG. 4 is an enlarged view of a first detail of the longitudinal section of FIG. 3.
Figure 5:
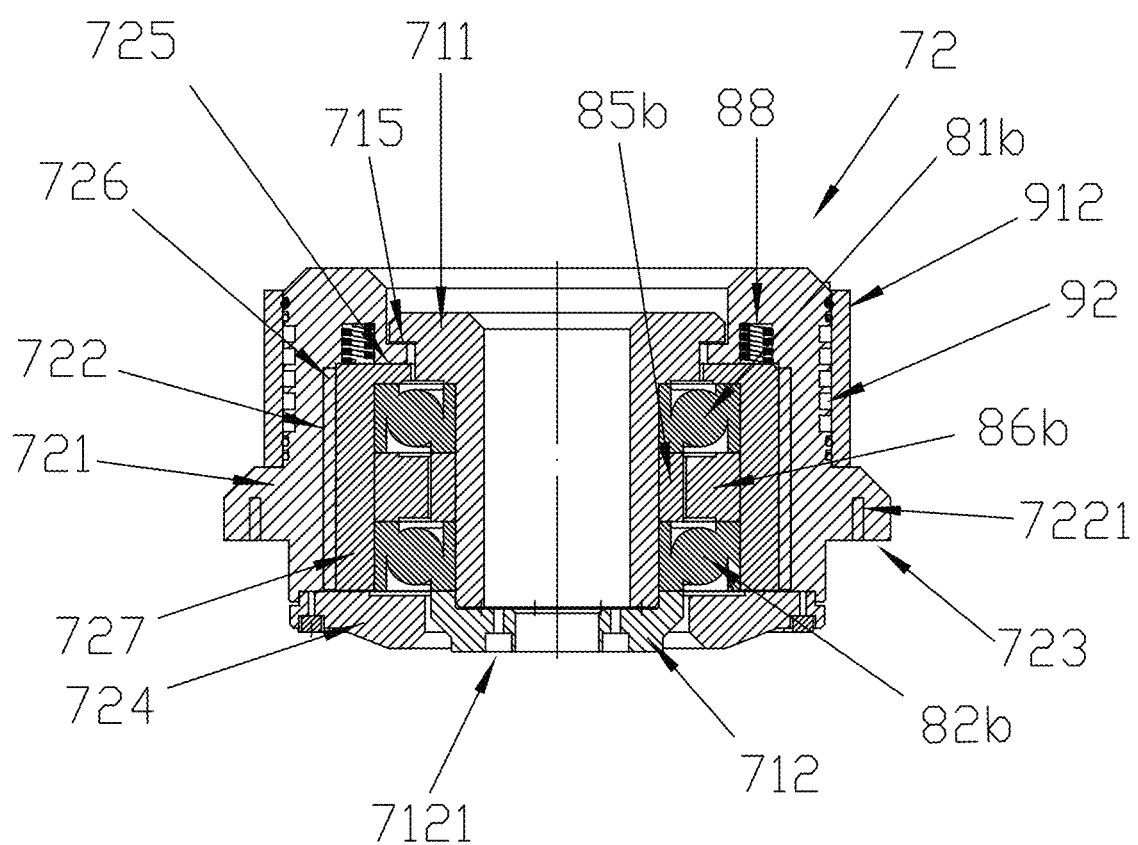
FIG. 5 is an enlarged view of a second detail of the longitudinal section of FIG. 3.
Figure 6:
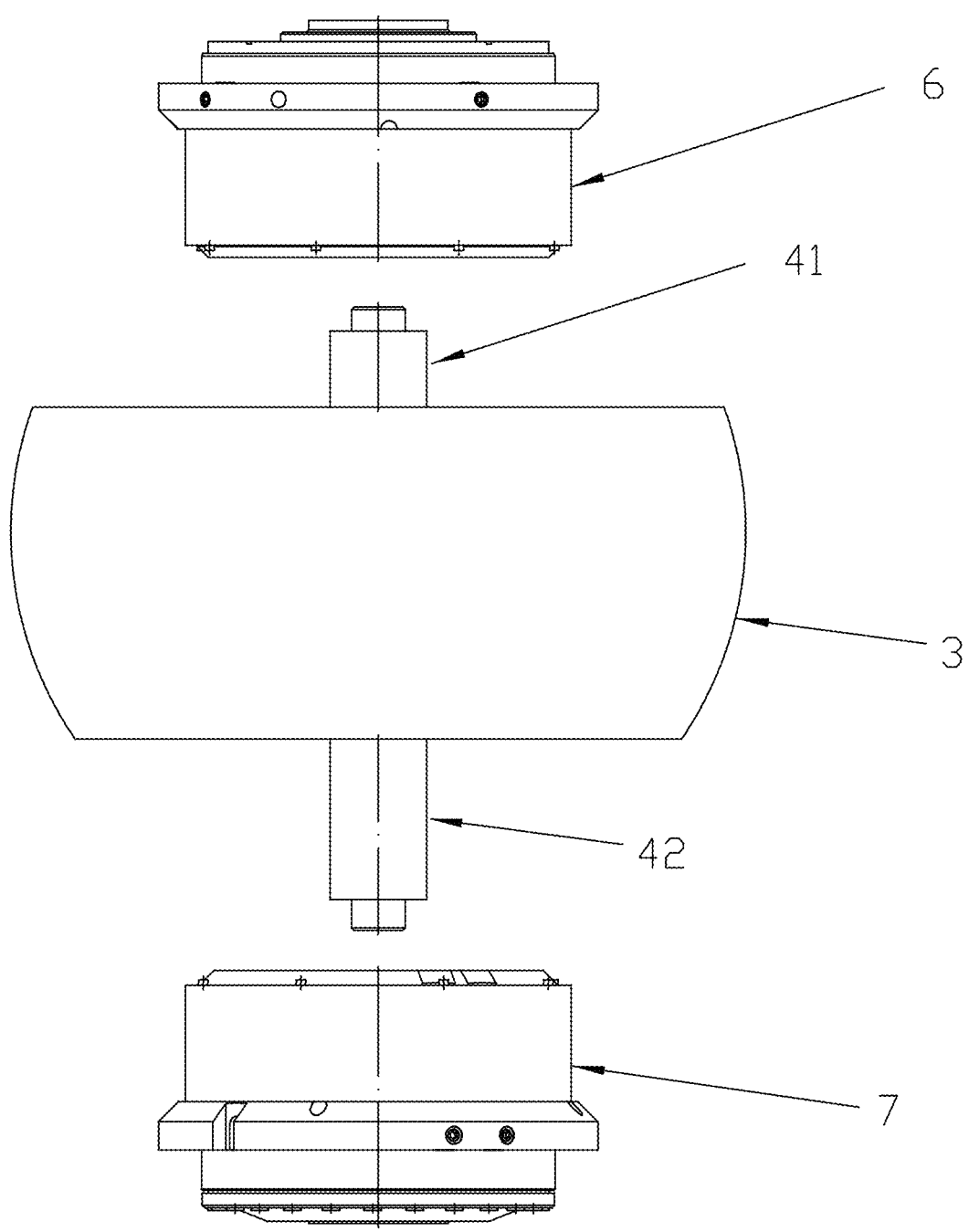
FIG. 6 is a exploded view of a part of the gyroscope of FIG. 1.
Figure 7:
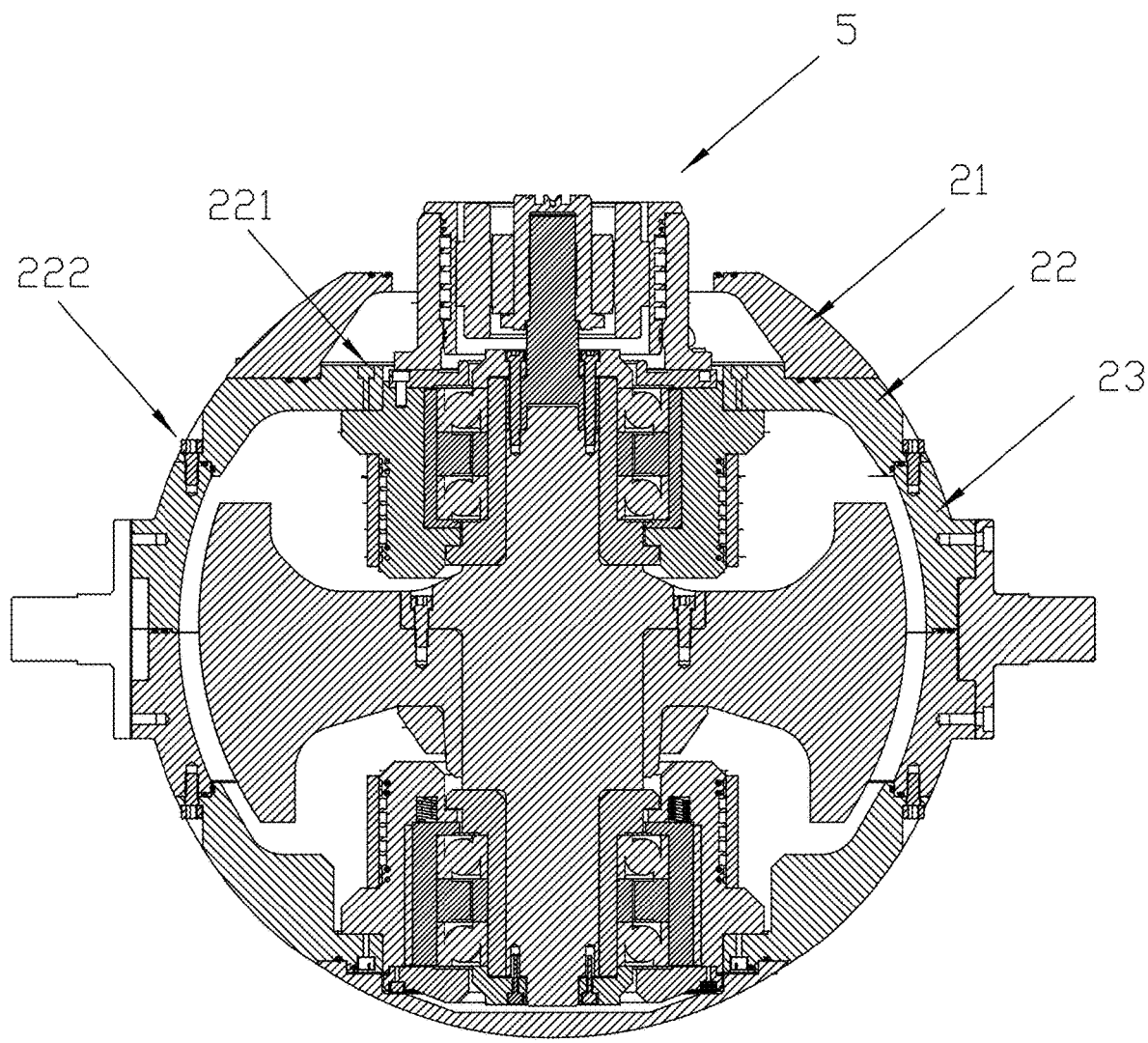
FIGS. 7, 8, 9 and 10 are longitudinal section views of the gyroscope of FIG. 1 which show the phases of disassembly of a first part of the gyroscope.
Figure 8:
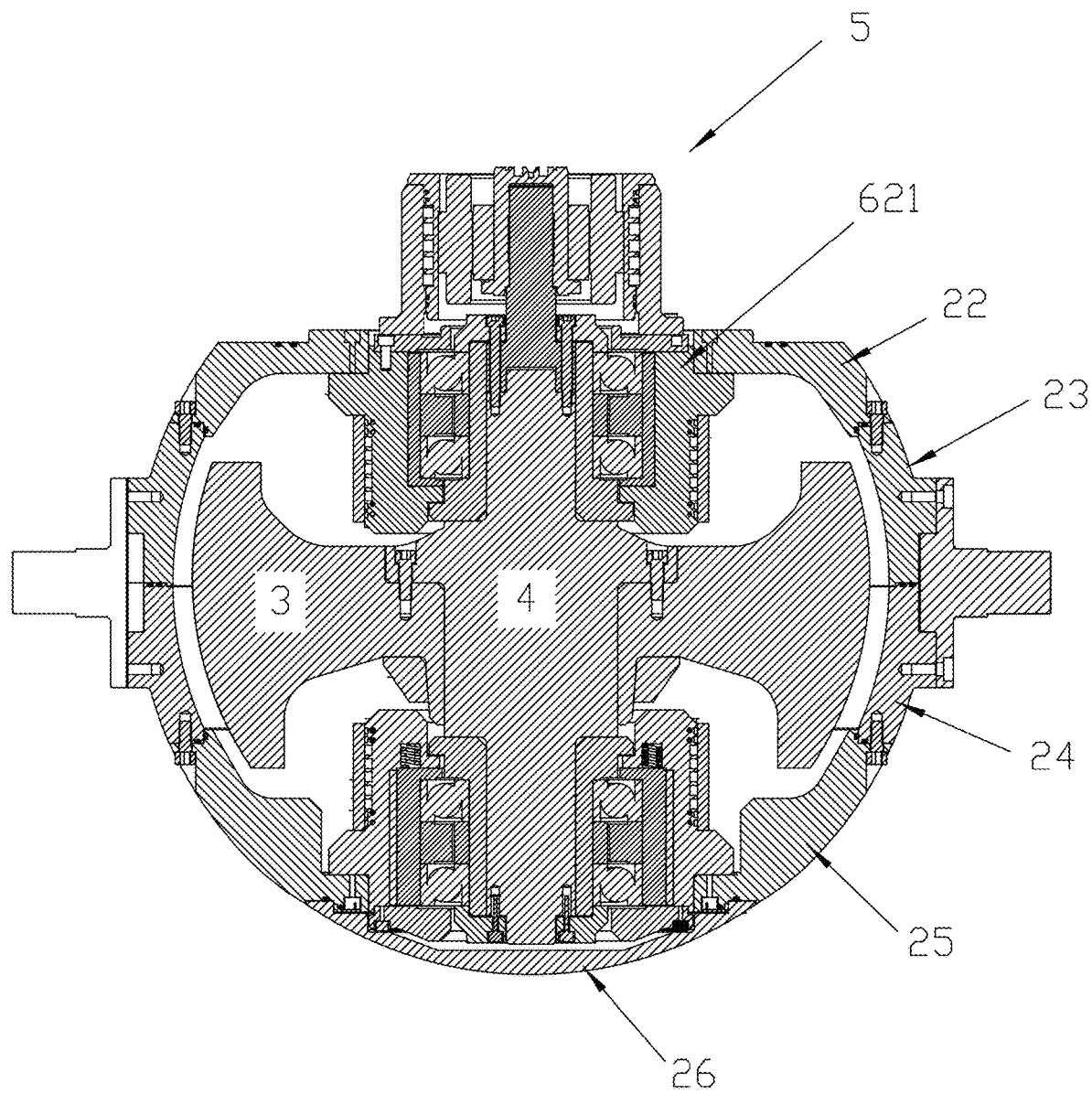
Figure 9:
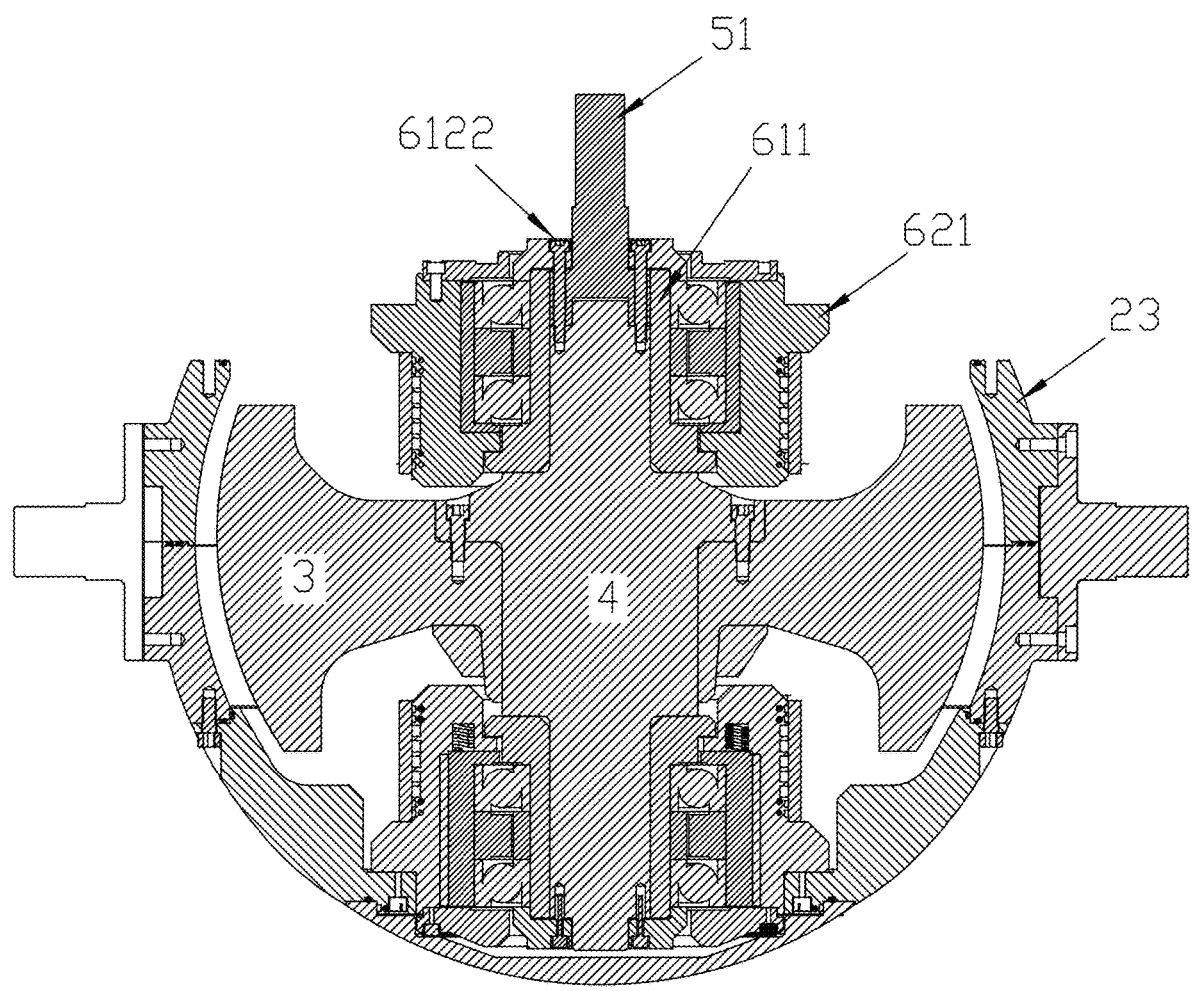
Figure 10:
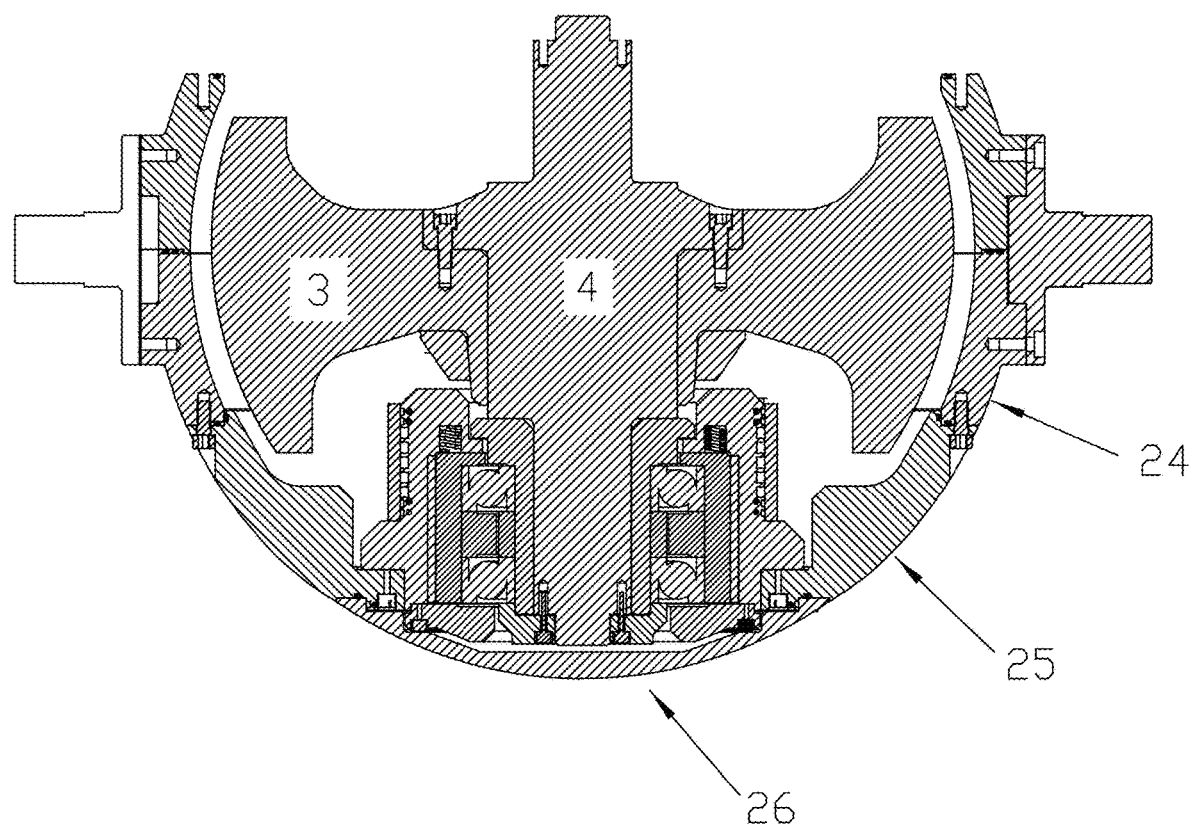

Contrary to the embodiment of FIGS. 1-13, where the first end portion 2*a* is formed out of three main portions, i.e. the first cover 20, the first annular element 21 and the second annular element, the first end portion 2*a* is here in FIG. 4 formed a single main portion in the form of an end cap or cover 2*a*. Further, contrary to the embodiment of FIGS. 1-13, where the second end portion 2*c* is formed out of two main portions, i.e. the fifth annular element 25 and second cover 26, the second end portion 2*c* is here in FIG. 4 formed a single main portion in the form of an end cap or cover 2*c*.

In preferred embodiments, the base portion 2*b* of the container 2 may have a height H2*b* which is at most about ⅔ of the height H2 of the container 2, preferably at most about ½ of the height H2 of the container 2. Additionally or alternatively, the first end portion 2*a*, which may be formed out of multiple releasably interconnected main parts or elements 20, 21, 22, such as for instance is the case in the embodiment shown in FIGS. 1-13, can have a height H2*a* of at least ¼ and preferably at least ⅓ of the height H2 of the container 2. Additionally or alternatively, the second end portion 2*c*, which may be formed out of multiple releasably interconnected main parts or elements 25, 26, such as for instance is the case in the embodiment shown in FIGS. 1-13, can have a height H2*c* of at least ¼ and preferably at least ⅓ of the height H2 of the container 2.

Forming the first end portion 2a and/or the second end portion 2c from relatively few main parts, e.g. forming it as a single part 2a, 2c, may facilitate that the design may be relatively simple and that there are relatively few joints. This may counteract leaking and/or may enable that servicing can be relatively easy. On the other hand, building up the first end portion 2a and/or the second end portion 2c from relatively many main parts, e.g. forming such an end portion 2a, 2c from for instance two or three or even more main parts 20, 21, 22, 25, 26, may facilitate that the mass of such container part 20, 21, 22, 25, 26 may be relatively low, which also may facilitate taking apart and/or re-assembling the container 2. It will be appreciated by the skilled person that different numbers of container main parts or segments may be desired for different designs, for example depending on the size and/or total weight of the container 2, which for instance may depend on the size of the yacht or other seacraft at which the gyroscope 1 is to be installed.

Figure 15:
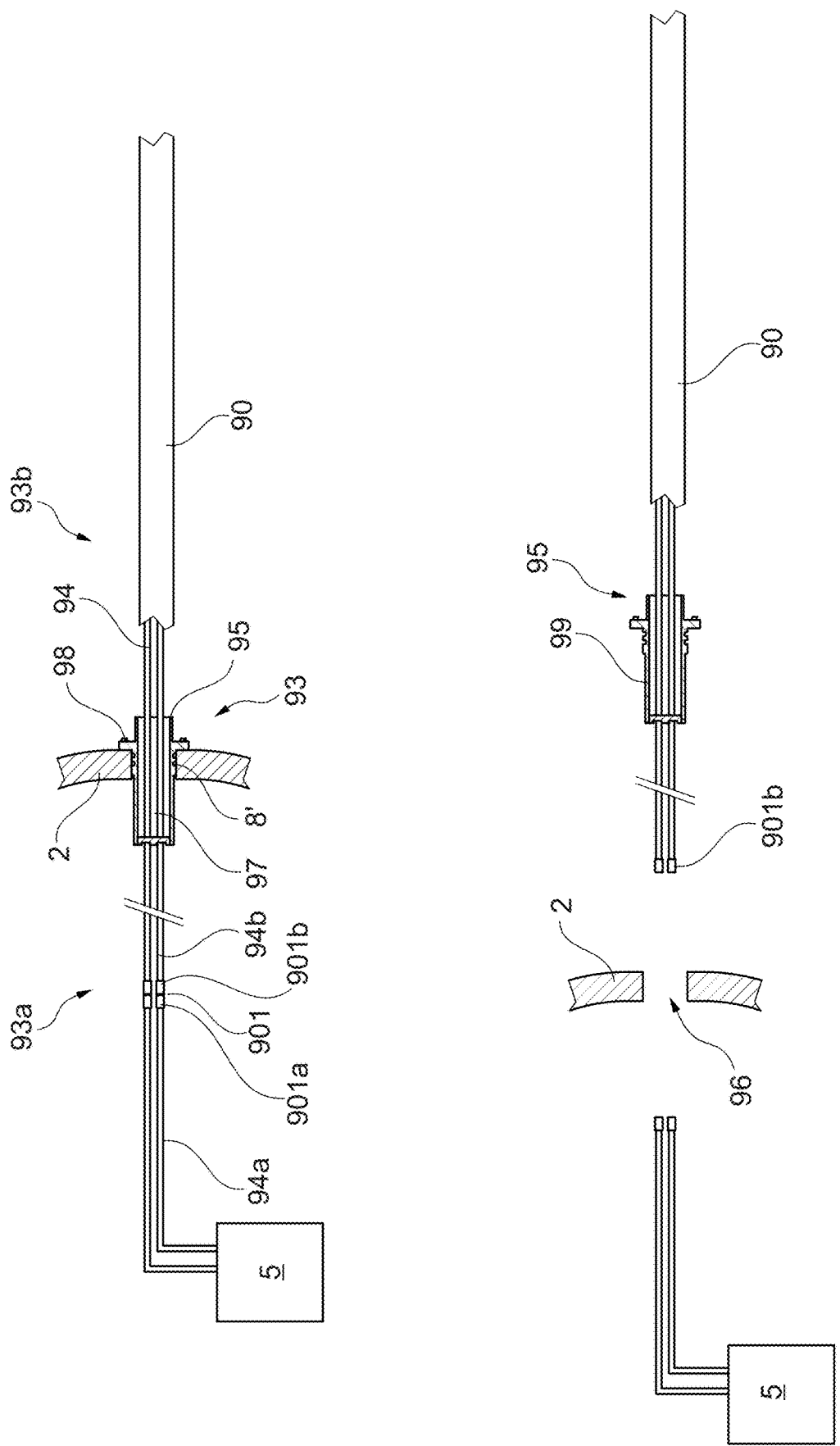
FIG. 15 shows a detail of a longitudinal section view of an embodiment of the container of the gyroscope which is provided with an airtight cable passage.

FIG. 15 shows a detail of a longitudinal section view of an embodiment of the container of the gyroscope which is provided with an airtight cable passage 93, through which wires 94 and/or a cable 90, such as a power cable for the electric motor 5 and/or cables for one or more sensors, such as a gas pressure sensor, which can be one or more of several other ones of an overall system cabling, can enter into the container 2. The airtight cable passage 93 may comprise an airtight plug 95 extending through a cable opening 96 provided in a wall of the container 2. Wires 94 may extend through said plug 95 and may be confined in an airtight manner for instance by encasing them in an airtight material 97, such as a resin 97 or the like, which may for instance fill up a plug housing or casing 99 substantially entirely.

Although the plug 95 may in embodiments form an integral part of a respective part 2a, 20, 21 of the container 2, it may preferably be removably connected to the container, for instance by means of fasteners 98, such as screws, and may then be joined with the container 2 by means of at least one, in particular at least two seals 8', which may be formed by a respective gasket or O-ring.

Advantageously, the wires 94 or the cable 90 may be interrupted at least one side of the airtight cable passage 93, for instance at the inside 93 of the, preferably substantially spherically-shaped, container 2, by means of an electrical connector 901, in particular a connector comprising cooperating female and male parts, more in particular a keyed connector counteracting incorrect mating of the respective wires 94a, 94b. Here, the connector 901 is part of the cable, but it may alternatively be part of the plug 95 or part of the motor 5, e.g. by forming a terminal on said motor 5.

Such removable plug 95 and releasable connector 901 may for instance facilitate that in order to remove or replace a damaged motor cable or other cable or wire, which for instance is damaged outside the container 2, the cable 90 can be released from the container 2 by removing the plug 95 and disconnecting the connector 901. The cable 90 can then be replaced by a replacement cable 90 already provided with such plug 95 and a respective connector part 901b.

Although the cable 90 and/or wires 94 are here interrupted by a releasable connection formed by a connector 901 at the inner side 93a of the container 2, the gyroscope 1 may, alternatively or additionally, in embodiment comprise such a electrical connector 901 at the outer side 93b of the container 2.

It is noted that the present disclosure also relates to gyroscopes according to the following clauses.

1. A gyroscope 1 for an anti-roll stabilizer for seacraft 1, comprising:

a container 2, apt to be mounted on a suspension 102 so as to be able to oscillate around a first axis Y;

a flywheel 3, placed inside said container 2, having a shaft 4 apt to rotate around a second axis X, transverse with respect to said first axis Y, said shaft 4 of said flywheel 3 having a first end 41 and a second end 42;

a first support device, placed inside said container 2, apt to support said first end 41 of said shaft 4 so as to allow the relative rotation of said shaft 4 with respect to said container 2;

a second support device 7, placed inside said container 2, apt to support said second end 42 of said shaft 4 so as to allow the relative rotation of said shaft 4 with respect to said container 2; and an electric motor 5, placed inside said container 2, having a shaft 51 which is apt to transmit a torque to said first end 41 of said shaft 4 of said flywheel 3;

wherein said container 2 comprises a first cover 20, a first annular element 21 which is connected removably to said first cover 20, a second annular element 22 which is connected removably to said first annular element 21, a third annular element 23 which is connected removably to said second annular element 22, a fourth annular element 24 which is connected removably to said third annular element 23, a fifth annular element 25 which is connected removably to said fourth annular element 24, and a second cover 26 which is connected removably to said fifth annular element 25;

wherein said first support device 6 comprises a first element 611 connected removably to said first end 41 of said shaft 4 and a second element 62, coaxial to said first element 611, which is connected removably to said container 2, said first element 611 being able to rotate with respect to said second element 62, said first and second elements 611, 62 of said first support device 6 being connected one to the other by means of at least one rolling bearing 81a, 82a, said at least one rolling bearing 81a, 82a preferably being formed as at least one ball bearing 81a, 82a;

wherein said first element 611 of said first support device 6 is connected removably to said first end 41 of said shaft 4 and said second element 62 of said first support device 6 is connected removably to said second annular element 22 of said container 2;

wherein said electric motor 5 is connected removably to said second element 62 of said first support device 6;

wherein said second support device 7 comprises a first element 711 connected removably to said second end 41 of said shaft 4 and a second element 72, coaxial to said first element 711, which is connected removably to said container 2, said first element 711 being able to rotate with respect to said second element 72, said first and second elements 711, 72 of said second support device 7 being connected one to the other by means of at least one rolling bearing 81b, 82b;

and wherein said first element 711 of said second support device 7 is connected removably to said second end 42 of said shaft 4 and said second element 72 of said second support device 7 is connected removably to said fifth annular element 25 of said container 2.

2. Gyroscope 1, according to clause 1, wherein said first element 611 of said first device 6 apt to support said shaft 4, comprises a first bush 611 inserted on said first end 41 of said shaft 4, said first bush 611 being coupled with interference with said at least one rolling bearing 81a, 82a; and in which said first bush 611 and said first end 41 of the shaft 4 are made reciprocally integral one with the other by means of a blocking flange 612 connected removably to the first end 41 of said shaft 4 and to said first bush 611; and wherein said first element 711 of said second device 7 apt to support said shaft 4, comprises a first bush 711 inserted on said second end 42 of said shaft 4, said first bush 711 being coupled with interference with said at least one rolling bearing 81b, 82b; and in which said first bush 711 and said second end 42 of the shaft 4 are made integral one with the other by means of a blocking flange 712 connected removably to the second end 42 of said shaft 4 and to said first bush 711.

3. Gyroscope 1 according to clause 2, wherein said second element 62 of said first support device 6 comprises a flanged support 621, said flanged support 621 having a seat 622 wherein said at least one rolling bearing 81a, 82a is inserted, said flanged support 621 being joined removably to said second annular element 22 of said container 2; and wherein said second element 72 of said second support device 7 comprises a flanged support 721, said flanged support 721 having a seat 722 wherein said at least one rolling bearing 81b, 82b is inserted, said flanged support 721 being joined removably to said fifth annular element 25 of said container 2.

4. Gyroscope according to clause 3, wherein one of said two support devices 7 comprises a spacer 727 inserted in said seat 722 of said flanged support 721, said spacer 727 being coupled to the outer ring of said at least one rolling bearing 81b, 82b, said spacer 727 being sliding along the X axis; and wherein a plurality of springs 88 are provided which press on one end of said spacer 727.

5. Gyroscope 1 according to clause 4, wherein said spacer 727 is a substantially tubular body.

6. Gyroscope 1 according to clause 3 or 4 or 5, wherein said flanged support 721 of the other one between said first and second device 6, 7 apt to support said shaft 4 is in aluminium alloy and comprises an internal lining 726 in steel, integral with said flanged element 721.

7. Gyroscope according to one of the preceding clauses, wherein devices of liquid cooling 91, 92 are provided to dissipate the heat released by said flanged supports 621, 721.

It is noted that for the purpose of clarity and a concise description features are described herein as part of the same or separate embodiments, however, it will be appreciated that the scope of the invention may include embodiments having combinations of all or some of the features described.

For example, it will be appreciated that one or more features of the embodiment shown in FIGS. 1-13 can be incorporated within another embodiment, such as an embodiment of one of the appended claims or an embodiment described in one of the above clauses, without departing from the current disclosure and without presenting a skilled person with information, as such combinations of features are at least implicit to a person skilled in the art, and are not explicitly written out for the purpose of clarity and conciseness.

Further, it is noted that the invention is not restricted to the embodiments described herein. It will be understood that many variants are possible.

Such variants will be apparent for the person skilled in the art and are considered to lie within the scope of the present disclosure.

The invention claimed is:

1. A support device for a gyroscope for an anti-roll stabilizer for seacraft, said support device comprising:
a first element removably connected to an end of a shaft of a flywheel of the gyroscope; and
a second element, coaxial to said first element, removably connected to a container of the gyroscope,
wherein said first element is rotatable with respect to said second element, wherein said first and second elements of said support device are connected one to the other by at least one rolling bearing, said at least one rolling bearing being formed as at least one ball bearing; and
wherein the first element comprises a first bush for accommodating the end of the shaft of the gyroscope, said first bush being coupled with interference with said at least one rolling bearing.

2. The support device according to claim 1, wherein said first and second elements of said support device are connected one to the other by at least two rolling bearings provided coaxially and next to each other in an axial direction of said at least two rolling bearings.

3. The support device according to claim 1, wherein a height of the first element of the support device is larger than an inner diameter of said first element.

4. A gyroscope for an anti-roll stabilizer for seacraft, comprising:
a container configured to be mounted on a suspension so as to be able to oscillate around a first axis;
a flywheel, inside said container, the flywheel having a shaft configured to rotate around a second axis, transverse with respect to said first axis, said shaft of said flywheel having a first end and a second end;
a first support device, placed inside said container, configured to support said first end of said shaft to allow the relative rotation of said shaft with respect to said container;
a second support device, placed inside said container, configured to support said second end of said shaft to allow the relative rotation of said shaft with respect to said container;
an electric motor inside said container configured for rotating said shaft of said flywheel,
wherein said container comprises a base portion configured to be mounted on the suspension, the base portion comprising a first end portion, as an upper end portion, which is connected removably to said base portion, and a second end portion, as a lower end portion, which is connected removably to said base portion; and
wherein said first support device comprises,
a first first support device element removably connected to the first end of the shaft of the flywheel of the gyroscope; and
a second first support device element, coaxial to said first first support element, connected removably to the container of the gyroscope,
wherein said first first support device element is rotatable with respect to said second first support device element, wherein said first and second elements of said first support device are connected one to the other by at least one rolling bearing;
wherein said second support device comprises a first second support device element connected removably to said second end of said shaft and a second second support device element, coaxial to said first second support device element, which is connected removably to said container, said first second support device element being rotatable with respect to said second second support device element, said first and second elements of said second support device being connected one to the other by at least one rolling bearing; and
wherein the respective first support elements of the respective first and second support devices configured to support said shaft comprise a first bush for accommodating the respective end of said shaft of the gyroscope, said first bush being coupled with interference with said at least one rolling bearing.

5. The gyroscope according to claim 4, wherein said container comprises a first cover, a first annular element which is connected removably to said first cover, a second annular element which is connected removably to said first annular element, a third annular element which is connected removably to said second annular element, a fourth annular element which is connected removably to said third annular element, a fifth annular element which is connected removably to said fourth annular element, and a second cover which is connected removably to said fifth annular element.

6. The gyroscope according to claim 5, wherein the base portion of the container comprises the third annular element and the fourth annular element.

7. The gyroscope according to claim 5, wherein the first end portion comprises at least the first annular element connected removably to the base portion, and wherein the first end portion further comprises a removable first cover, directly or indirectly removably connected to said first annular element, via a second annular element removably connected to said first annular element.

8. The gyroscope according to claim 5, wherein the second end portion comprises the fifth annular element which is connected removably to the base portion, and wherein the second end portion further comprises a removable second cover which is removably connected to said fifth annular element.

9. The gyroscope according to claim 4, wherein the first end portion, the base portion and the second end portion are joined one to the other by seals to promote an airtight coupling.

10. The gyroscope according to claim 4, wherein devices of liquid cooling are provided to dissipate any heat released by said first and the second support devices.

11. The gyroscope according to claim 4, wherein said first bush and said respective end of the shaft are configured to be reciprocally integral one with the other by a blocking flange connected removably to the respective end of said shaft and to said first bush.

12. The gyroscope according to claim 4, wherein the electric motor has a shaft which is configured to transmit a torque to said first end of said shaft of said flywheel, and wherein an end of said motor shaft is removably joined to the first end of the shaft of the flywheel by a connector or mechanical coupling.

13. The gyroscope according to claim 4, wherein, when seen in axial direction of the shaft of the flywheel the first support device is substantially located between the flywheel and the electric motor.

14. The gyroscope according to claim 4, wherein the container is provided with an airtight cable passage
comprising an airtight plug extending through a cable opening provided in the container and joined with the container by means of at least one seal.

15. An anti-roll stabilizer, comprising a gyroscope according to claim 4, and further comprising a frame, wherein said frame is arranged to be mounted to a vessel, and wherein a suspension of the gyroscope is attached to the frame so as to be able to oscillate the container around a first axis under the influence of vessel movement which could be caused by wave conditions, wherein the anti-roll stabilizer is further provided with one or more dampers which damp the movement of the container about the first axis.

16. The anti-roll stabilizer according to claim 15, further comprising a vacuum pump connected to the container of the gyroscope.

17. A vessel comprising:
an anti-roll stabilizer according to claim 15.

18. A method of stabilizing a moored or anchored seacraft comprising:
providing a gyroscope according to claim 4 in a moored or anchored seacraft, rotating the flywheel about the second axis; and
oscillating the container around the first axis, such as to produce a gyroscopic torque to port and starboard that can counteract roll movement of the seacraft.

19. A method of servicing or maintaining a gyroscope of an anti-roll stabilizer onboard of a seacraft, comprising the steps of:
providing a seacraft with an anti-roll stabilizer according claim 15;
removing at least one of the upper or lower end portions from the base portion onboard of the seacraft;
placing back said removed at least one of the upper or lower end portions and reconnecting said end portion with the base portion onboard of the seacraft; and
pumping out air of the interior of the container of the gyroscope onboard of the seacraft after the container of the gyroscope has been reassembled.

* * * * *